June 26, 1962   E. C. POLIDOR   3,040,437
AIRFOIL CHECKER
Filed May 21, 1959   5 Sheets-Sheet 3
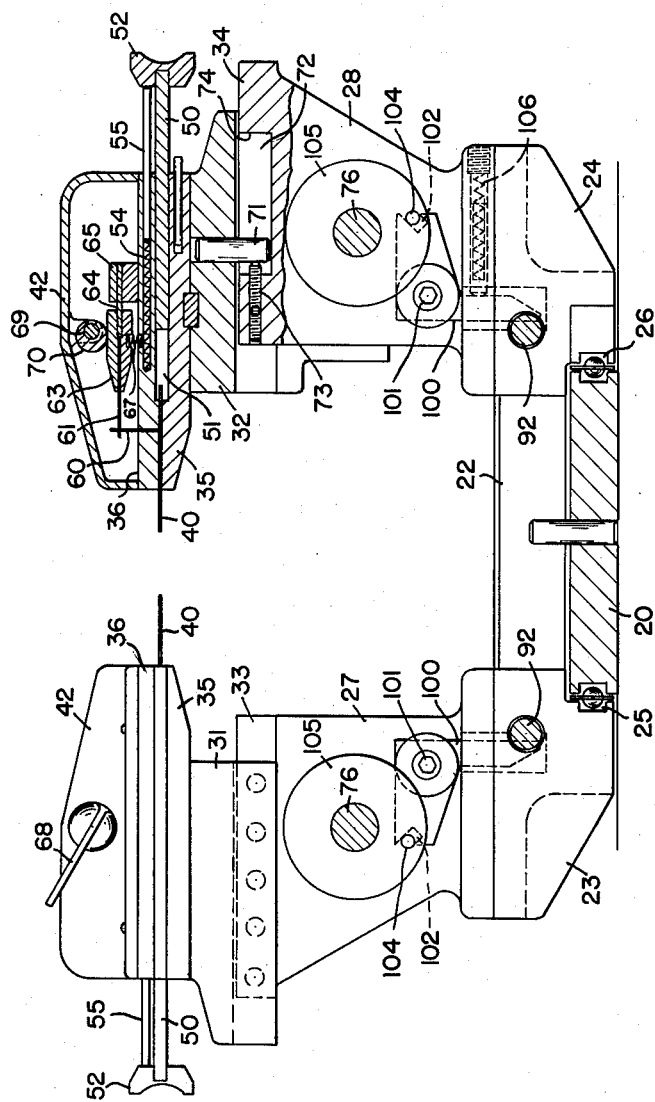
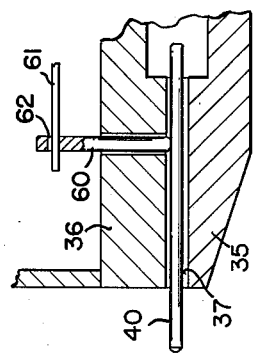
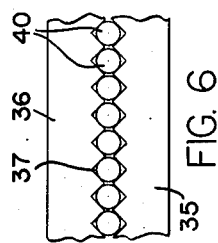
INVENTOR.
EDWARD C. POLIDOR
BY
Attorney June 26, 1962 — E. C. POLIDOR — 3,040,437
AIRFOIL CHECKER
Filed May 21, 1959 — 5 Sheets-Sheet 4

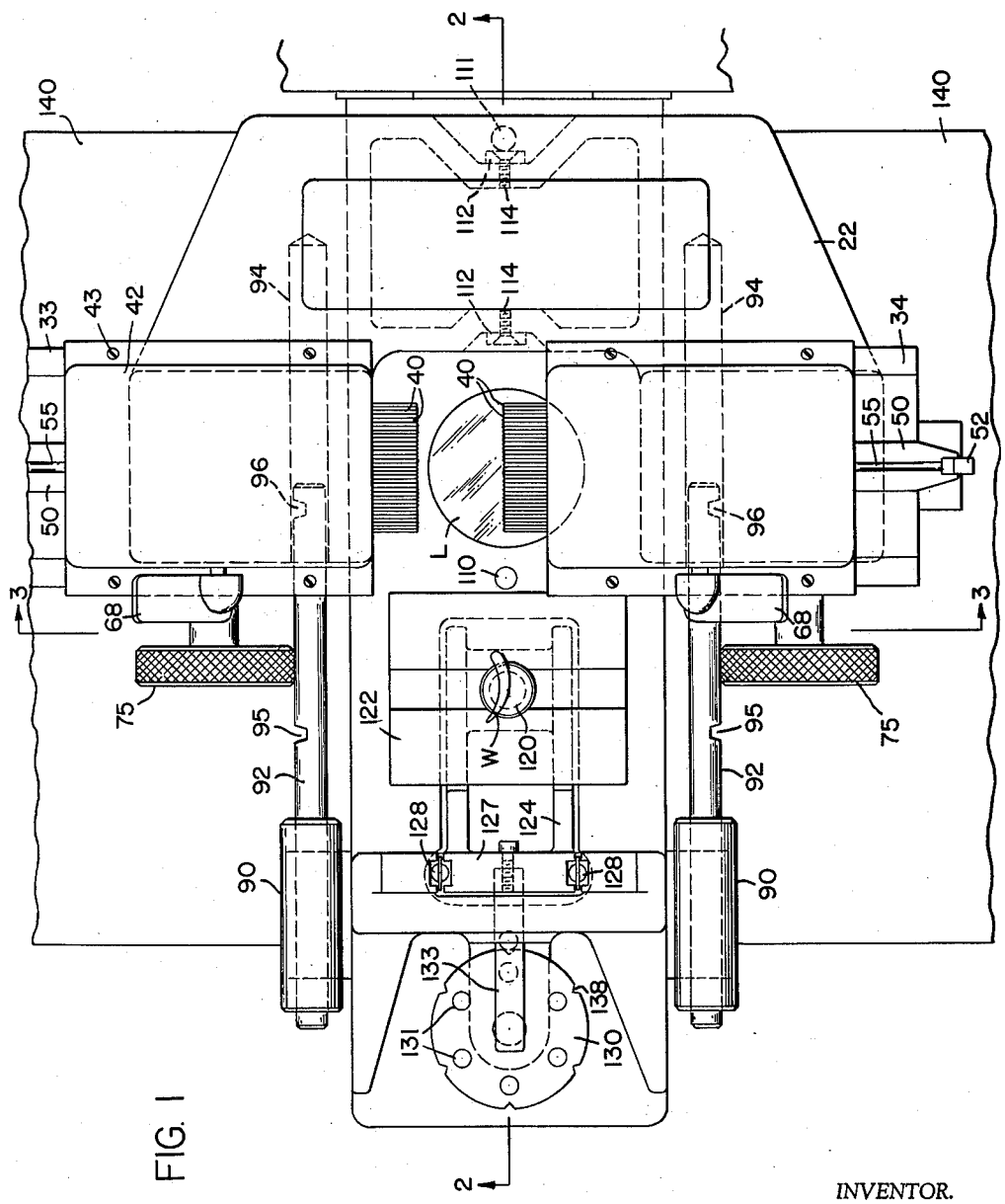
FIG. I
INVENTOR.
EDWARD C. POLIDOR

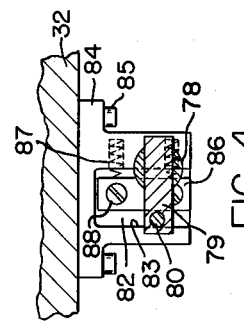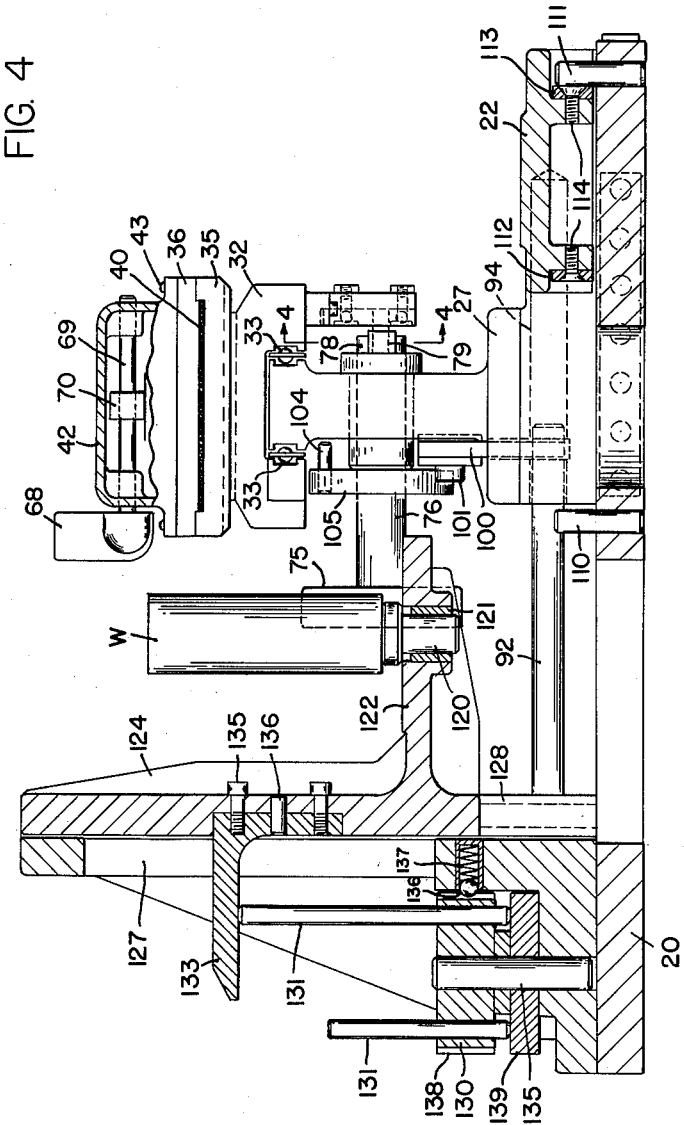

INVENTOR.
EDWARD C. POLIDOR
BY
Attorney

June 26, 1962     E. C. POLIDOR     3,040,437
AIRFOIL CHECKER
Filed May 21, 1959     5 Sheets-Sheet 5
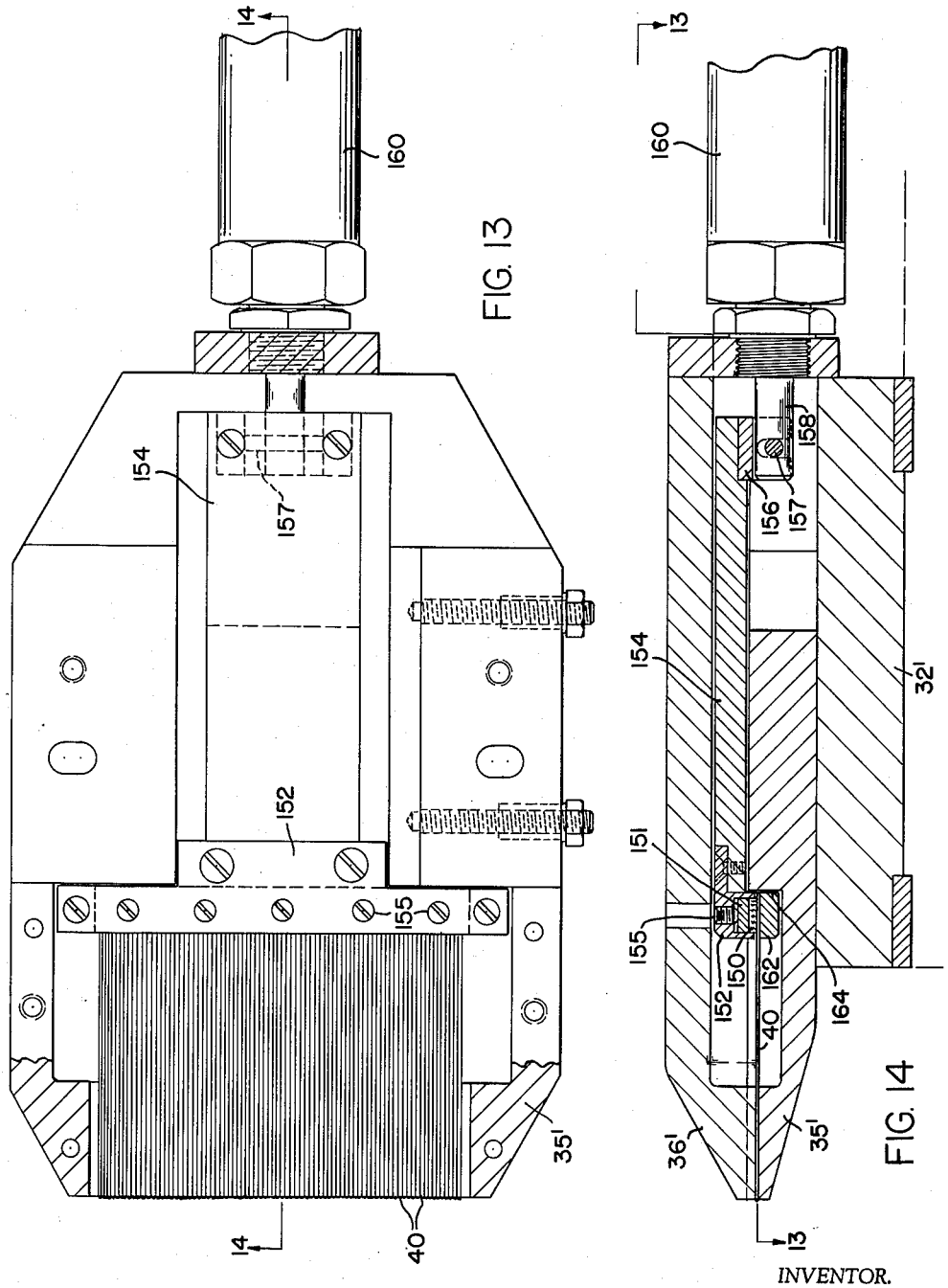
INVENTOR.
EDWARD C. POLIDOR
BY
Attorney

United States Patent Office 3,040,437
Patented June 26, 1962

3,040,437
AIRFOIL CHECKER
Edward C. Polidor, Rochester, N.Y., assignor to Automation Gages, Incorporated, Rochester, N.Y., a corporation of New York
Filed May 21, 1959, Ser. No. 814,836
3 Claims. (Cl. 33—175)

The present invention relates to testing apparatus, and more particularly to apparatus for checking the shape of irregular objects such as airfoils, turbine blades or buckets, nozzle partitions, etc.

Articles such as airfoils are quite thin. In places they may be only .0001" thick. Apparatus previously available for checking their shapes exert too much pressure on the thin airfoils, with the result that the testing device itself is liable to bend the airfoil out of shape unless extreme care is exercised during checking.

One object of the present invention is to provide testing apparatus which will permit of making a check for size and shape of an irregular shaped object, such as an airfoil, or a turbine blade or bucket, very quickly.

Another object of the invention is to provide testing apparatus for checking the shapes of airfoils, and similar objects, which will enable a very precise check to be made of the shape and size of the airfoil at different sections thereof.

Another object of the invention is to provide a testing device for optically checking the shapes of objects, which cannot be put into a focal plane, by transferring the shape of the object to a place where it can be projected.

Still another object of the invention is to provide checking apparatus of the character described which will enable even very thin blades to be checked with virtually no application of force or pressure thereto.

A still further object of the invention is to provide testing apparatus of the character described which will be simple in construction, easy to operate, and relatively inexpensive.

Other objects of the invention will be apparent hereinafter from the specification and from the recital of the appended claims.

In the drawings:

FIG. 1 is a plan view of an airfoil checker built according to one embodiment of this invention;

FIG. 2 is a longitudinal sectional view taken generally on the line 2—2 of FIG. 1 looking in the direction of the arrows;

FIG. 3 is a section taken generally on the line 3—3 of FIG. 1 looking in the direction of the arrows, one of the heads of the apparatus being broken away and shown in section and in operative position, the other head being shown in its withdrawn position;

FIG. 4 is a fragmentary sectional view taken on the line 4—4 of FIG. 2, looking in the direction of the arrows;

FIG. 5 is a fragmentary section on an enlarged scale showing the means for locking the gauging pins in adjusted position in the embodiment illustrated in FIGS. 1 to 3 inclusive;

FIG. 6 is a fragmentary end view on a still further enlarged scale looking at the left hand end of FIG. 5;

Figure 7:
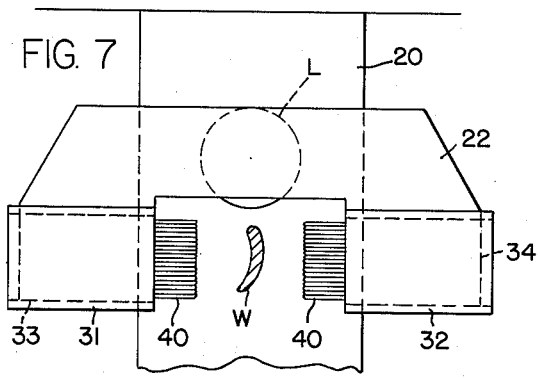
Figure 8:
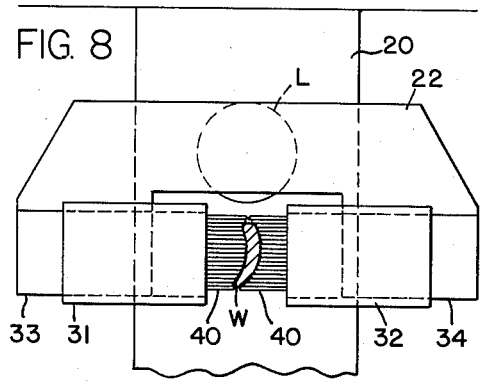
Figure 11:
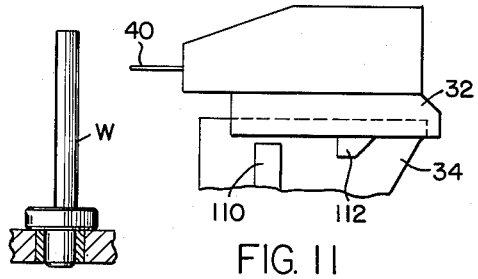
Figure 9:
Figure 12:
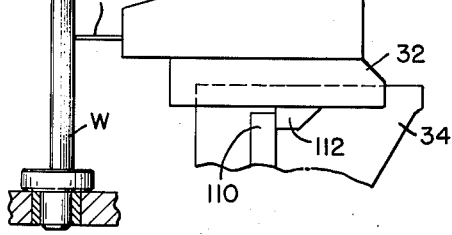

FIGS. 7, 8, 9, and 10 are diagrammatic views illustrating in plan the operation of the testing apparatus;

FIGS. 11 and 12 are diagrammatic sectional views corresponding to FIGS. 7 and 8, respectively, and further illustrating the operation of the apparatus;

FIG. 13 is a part plan, part horizontal sectional view, illustrating a further embodiment of the invention, this view being taken on the line 13—13 of FIG. 14; and FIG. 14 is a vertical sectional view taken on the line 14—14 of FIG. 13, looking in the direction of the arrows.

Referring now to the drawings by numerals of reference, 20 (FIG. 2) denotes the base of the apparatus. Mounted to slide on the base 20 longitudinally thereof is a carriage 22, which is forked and has two forwardly-extending portions 23 and 24 integral therewith (FIG. 3) that are spaced from one another. To insure easy movement of the carriage on the base and yet eliminate all side-play and back-lash, pre-loaded ball bearing ways 25 and 26 are provided between opposite sides of the base 20 and the furcations 23 and 24, respectively, of the carriage 22.

Mounted on the furcations or arms 23 and 24 of the carriage, and rigidly secured thereto, are risers 27 and 28. Slidably mounted on the upper surfaces of the risers 27 and 28, respectively, are heads or slides 31 and 32 respectively. Each of these heads slides on a pair of pre-loaded ball bearing ways 33 (FIG. 2) disposed at opposite sides of its associated riser 27 or 28. Mounted on each of the slides 31 and 32 is a lower serration plate 35 (FIGS. 3, 5 and 6) and mounted on each lower serration plate 35 is an upper serration plate 36. The two serration plates have a plurality of opposed V-shaped grooves therein, as shown in FIG. 6, adapted to receive and hold the pins 40. The two serration plates of each head are secured together, and secured over them is a rigid cover 42. The screws 43 (FIG. 2) serve to secure these parts together and to the heads or slides 31 and 32, respectively.

The pins 40 are normally freely slidable in the grooves 37 (FIGS. 5 and 6) formed by the registering V-shaped notches in the serrated plates 35 and 36. They may be moved outwardly of these grooves by pusher members 50 (FIG. 3), which are slidable in openings 51 formed by recesses in the opposed faces of the serration plates. The inner ends of the pins 40 project into these openings. The plates 50 may be actuated by handles 52. The members 50 are normally pressed outwardly of their respective slots 51 by coiled springs 54 which are seated in recesses in the upper serration plates and which engage against the inner ends of rods 55, that are secured to the handles 52.

The pins 40 are adapted to be locked in the positions, to which they may be pushed by the plates 50, by locking needles 60 (FIGS. 3 and 5). There is a pin 61 engaged in the eye 62 of each of these needles. The pins 61 of the respective heads 31 and 32 are secured in blocks 63 which are mounted by means of plates 64 in blocks 65 that are fastened to the respective heads. Coil springs 67 which are interposed between the upper serration plates 36 of the respective heads and the associated blocks 63 normally press the needles 60 upwardly out of engagement with the pins 40. The needles of each head can be moved into clamping engagement with the pins of the head by rocking a lever 68 (FIG. 2), which is associated with the particular head, from one of its extreme positions to another. This lever is secured to a shaft 69 (FIGS. 2 and 3) on which there is mounted an eccentric 70 which is disposed to engage the upper surface of the associated block 63.

The heads or slides 31 and 32 are adapted to be moved toward and away from one another by rotating knurled knobs 75 (FIG. 1). These knobs are secured to shafts 76 (FIGS. 2 and 3), to which there are also fastened discs 78. Each of the discs 78 has an arm 79 (FIG. 4) projecting from it which carries a pin 80 that engages in a slot 82 in a yoke 84 that is fastened by means of screws 85 to the respective head 32. The pin 80 travels in the slot 82 between one sidewall 83 of its respective slot 82 and the adjacent side of a block 86 which is mounted slidably in the recess 82, and which is constantly urged toward the sidewall 83 of the recess by coil springs 87 that are interposed between the yoke 84 and the block 86. Each block 86 is secured slidably to yoke 84 by bolts 88 that thread at their inner ends into the yoke. The shanks of these bolts are smaller than the holes in the respective block 86 through which the bolts pass.

Secured in blocks 90 (FIG. 1), that are fastened to the base 20 at opposite sides thereof, are two parallel rods 92 which extend in the direction of movement of the carriage 22. Each of these rods engages at its free end in a recess 94 bored in the carriage. Each of these rods 92 has a pair of longitudinally spaced notches 95 and 96 in it. These notches are adapted to receive selectively the catches 100 (FIG. 3). Each catch is in the form of a bell-crank lever that is mounted upon a stud 101 in one or other of the blocks 27 or 28. Each bell-crank lever has a notch 102 therein which is adapted to be engaged by a pin 104, that is carried by a disc 105 which is secured to each shaft 76.

The shafts 76 (FIGS. 1 and 2) are mounted against axial movement in the respective risers 27 and 28. By pulling or pushing on the two knobs 75, then, the carriage 22 can be moved manually on the base. Its movement in opposite directions is limited by pins 110 and 111 (FIG. 2) which are adapted to engage stops 112 and 113, respectively, that are secured by screws 114 to opposite end faces of the carriage. When the carriage is in one position or the other, the heads 31 and 32 can be moved to or from operative position by rotating the shafts 76 by means of these knobs 75.

The amount of movement of each head is determined by a pin 71 (FIG. 3) which is secured in the respective head, and which extends into a slot 72 in the head. The pin 71 is positioned to engage an adjustable screw stop 73 at the inner limit of movement of the respective head, and the wall 74 of the slot 72 at the outer limit of each movement. When the head is at the inner limit of its movement, the pin 104 of the associated disc 105 will have been rotated far enough to engage in the slot 102 of the bell-crank catch 100 to move the catch to disengaged position. A coil spring 106, which engages the lower arm of the respective catch, constantly urges each catch to locking position.

The workpiece, which is to be checked, which is here shown as an airfoil W, is mounted in a suitable workholding fixture 120 (FIG. 2) that is rotatably mounted by means of a bushing 121 on the projecting, generally horizontal, table-like portion 122 of a slide 124. This slide is vertically adjustable in pre-loaded ball bearing guide ways 123 on a column 127 that is secured to the base 20 of the machine.

The slide 124 is adapted to be held in different vertical positions, for checking the workpiece in different vertical sections thereof, by means of an adjusting mechanism comprising an indexible cylindrical disc 130 in which there are secured a plurality of rods 131 that are respectively of different lengths. These rods are adapted to engage the under surface of an arm 133 which projects rearwardly from the slide 124, and which is secured thereto by screws 135 and a dowel 136. The rods 131, as stated, are of respectively different lengths, and by bringing different rods into engagement with the under face of the arm 133, the work can be adjusted to different heights so as to permit gauging it at different sections along its height. The different rods 131, respectively, are brought into operative engagement with the arm 133 merely by manually rotating the disc 130. This disc is journaled on a shaft 135 in the upright 127. The disc 130 is adapted to be held in any indexed position by a ball detent 136 which is spring pressed into engaging position by a coil spring 137. The ball 136 is adapted to snap into peripheral notches 138 formed on the disc as the disc is rotated over the ball. A hardened plate 139 is secured on the upper face of the column 127; the lower ends of the rods 131 ride on this plate.

The base 20 is adapted to be mounted on a table 140 (FIG. 1) of a conventional optical projector, for instance. There is a hole in this table through which the lens L (FIG. 1) of the projector extends.

Figure 10:
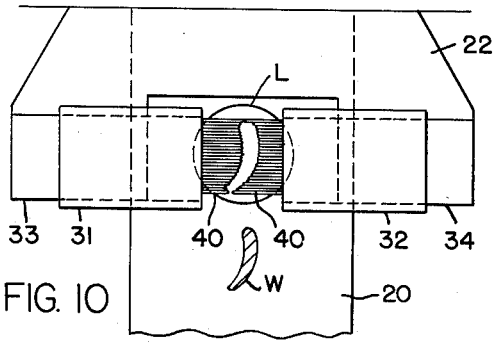

In the use of the device, the handles 52 (FIG. 3) are pushed inwardly to push the pins 40 into operative position. The carriage 22 is first moved forward with the heads or slides 31 and 32 retracted (FIG. 7) until the stop 112 strikes the stop pin 110. Then the knobs 75 are rotated to rotate the shafts 76, causing the pins 80 on the crank arms 79 (FIG. 4) to move the slides 31 and 32 toward the blade W which is to be checked. As the slides 31 and 32 move toward one another the pins 40 come into engagement with opposite sides of the workpiece, and by reason of their contact with the workpiece are slid in the grooves 37 (FIGS. 5 and 6), and assume positions corresponding to the shape of the workpiece, as shown in FIG. 8. The pins are then locked in position by rocking the levers 68 (FIGS. 2 and 3) to cause the eccentrics 70 to move the needles 60 into locking engagement with the pins. With the pins 40 now in locked positions the slides 31 and 32 are retracted again by rotating the knobs 75 in the proper directions, but the pins 40 now remain in their locked positions. The carriage 22 is then moved rearwardly until the stop 113 (FIG. 2) engages the pin 111. The pins will then be in the positions shown diagrammatically in FIG. 9. The slides 31 and 32 are then moved toward one another until the pins 71 (FIG. 3) in the two slides strike the associated stop screws 73. This will bring the pins 40, as shown in FIG. 10, over the lens L of the projector in the same position which they had when they were in engagement with the workpiece in FIG. 8. They will, therefore, outline the shape of the vane or airfoil W in the section in which they previously were engaged with the vane, and this sectional shape can be compared with the desired shape projected on the lens or onto a screen, thereby determining whether the workpiece falls within the permitted tolerance, or not.

To gauge different sections of the workpiece, the vertical position of the blade W is adjusted; the pins 40 have to remain in the same focal plane. The spacer bars 131 are made to precise lengths to accurately position the vertical slide 124 which carries the workpiece so that various sections of the workpiece can be tested.

The checking device of the present invention can be used to test shapes of objects which cannot be put into the focal plane of a projector. By means of the pins 40 the shape can be transferred, however, to a place where it can be projected. After the pins 40 have been brought into contact with the workpiece and have been locked in their contacting positions, they will project the exact contour of the airfoil section when the slides 31 and 32 are returned to their original locations.

The device of the present invention can not only be used with conventional contour projectors, but can also be used with known types of comparators. The unit will accommodate various sizes of blades, buckets and nozzle partitions of various lengths.

Instead of locking the pins 40 positively by means of needles as in the embodiment of the invention just described, they may be mounted to be frictionally held, as shown in FIGS. 13 and 14, by a piece of hard felt 150 that is secured to an adjustable pressure plate 151. The pressure plate 151 is slidably mounted in a guide groove in a plate 152 that is secured to an actuator slide 154. A screw 155 is threaded into the guide 152 to adjust the plate 151 and felt 150.

In the embodiment shown, the actuator slide 154 is moved by fluid pressure, this slide having a fork 156 secured at its rear end which engages a pin 157 on a piston rod 158 that is secured to a piston not shown which slides in the cylinder 160.

The pins 40 are mounted at their forward ends in serrated plates 35' and 36' similar to the plates 35 and 36 previously described, and having opposed V-shaped notches therein, which together form grooves for the pins 40. At the rear end the pins are mounted in V-grooves in a separator plate 162 which is secured in any convenient manner to the actuator slide 154. In the apparatus shown in FIGS. 13 and 14 the pins 40 are moved by the frictional engagement of the felt 150 forward into engagement with the workpiece upon forward movement of piston 58. The pins are locked in engaged position by locking the pusher, which in this case is the piston 158. This can be done by leaving the valve, which controls the direction of movement of this piston, in the corresponding limit position.

The whole unit, including the serrated plates 35', 36', the actuator slide 154, and the cylinder 160, is mounted on a head or slide 32', similar to the slides 31 and 32 of the first described embodiment, and like those slides movable on a carriage 22 transversely of the direction of movement of the carriage. The two slides 32' may be moved on the carriage 22 by rotating shafts 76, as in the first described embodiment, or they may be moved by fluid pressure, or through any other suitable power means.

While the invention has been described in connection with two different embodiments thereof, it will be understood that it is capable of further modification, and this application is intended to cover any variations, or adaptations of the invention, following, in general, the principles of the invention and including such departures from the present disclosure as some within known or customary practice in the art to which the invention pertains and as fall within the scope of the invention or the limits of the appended claims.

Having thus described my invention, what I claim is:

1. Apparatus for checking the shape of an object comprising a base, a support the workpiece mounted on said base, an optical projector having a lens spaced from said support, a rectilinearly reciprocable carriage, a slide reciprocable rectilinearly on said carriage inwardly and outwardly in a direction transverse of the direction of reciprocation of said carriage, a plurality of pins mounted in said slide in parallelism to one another and to extend parallel to the direction of movement of said slide, means for moving said carriage to move said slide between a position of lateral alignment with the workpiece and a position of lateral alignment with the lens, means for moving said slide comprising a rotary shaft, and means operatively connecting said shaft to said slide to move said slide in opposite directions, respectively, upon rotation of said shaft in opposite directions, locking means operatively connected to said shaft to lock said carriage against movement when said slide is at the inner limit of its movment, means for positively limiting movement of said carriage in both directions, means positively limiting movement of said slide in both directions, means for moving said pins independently of said slide to bring them into engagement with the workpiece when said slide is in lateral alignment with said workpiece, means for retaining said pins in the positions to which they are moved by the workpiece when they engage the same, said locking means comprising a bar that extends in the direction of movement of said carriage and that has two longitudinally-spaced notches in it that correspond, respectively, to the two limit positions of movement of the carriage, and a rockable catch pivotally mounted on said carriage, and means carried by said shaft for rocking said catch into and out of engagement with said notches when the slide is moved in opposite directions, respectively, by rotation of said shaft.

2. Apparatus for checking the size and shape of airfoils and the like, comprising a base, a work support mounted on said base and adapted to hold the workpiece which is to be checked, a pair of slides, a carriage, said slides being reciprocably mounted on said carriage for rectilinear movement toward and away from one another, and said carriage being mounted on said base for rectilinear reciprocation thereon in a direction at right angles to the direction of reciprocation of said slide, a plurality of parallel, independently movable pins slidably mounted on each of said slides for movement relative thereto in the direction of reciprocation of the slides, means for moving the pins on their slides independently of the slides, means for retaining the pins in positions to which they are moved, means for moving the slides and carriage comprising a pair of spaced, parallel shafts rotatably mounted in the carriage but held against axial movement, means connecting one of said shafts to each of said slides, respectively, to move the connected slide in opposite directions, respectively, on rotation of the connected shaft in opposite directions, respectively, and a handle secured to each shaft to move the carriage in opposite directions by pulling or pushing on the handles and to move the slides by rotating the handles, means for locking the carriage at opposite limits of its movement comprising a catch operatively connected to each shaft to be operated thereby when the shafts are rotated in the directions to move the slides toward one another said locking means including a pair of parallel bars extending in the direction of movement of the carriage and both fixed relative to the base, each bar having a pair of longitudinally-spaced notches therein whose locations correspond, respectively, to the limit positions of movement of the carriage, said catches are pivotally mounted in the carriage for swinging movement about parallel axes, respectively, extending in the direction of movement of the carriage, and each of said catches is in the form of a lever which is adapted to engage at one end in the notches of its associated bar and which is notched at its opposite end, and each shaft has a pin thereon positioned to engage in the notch of its associated lever when the two shafts are rotated in directions to move the two slides toward one another.

3. Apparatus for checking the size and shape of airfoils and the like as claimed in claim 2 wherein means are provided for positively limiting the movements of the slides in opposite directions, and for limiting the movements of the carriage in opposite directions.

References Cited in the file of this patent

UNITED STATES PATENTS

| 1,261,438 | Reinhardt | Apr. 2, 1918 |
| 2,222,165 | Beardsley | Nov. 19, 1940 |
| 2,835,983 | Razdow | May 27, 1958 |

FOREIGN PATENTS

| 762,618 | England | Nov. 28, 1956 |